(12) United States Patent
Wang et al.

(10) Patent No.: US 7,743,123 B2
(45) Date of Patent: Jun. 22, 2010

(54) AGGREGATING INFORMATION FROM A CLUSTER OF PEERS

(75) Inventors: Jiahe Helen Wang, Issaquah, WA (US); Nikita Borisov, Urbana, IL (US); Qiang Huang, Princeton, NJ (US); David Jao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 11/311,443

(22) Filed: Dec. 19, 2005

(65) Prior Publication Data

US 2007/0168508 A1 Jul. 19, 2007

(51) Int. Cl.
 *G06F 15/177* (2006.01)
(52) U.S. Cl. ............... 709/222; 709/221; 709/230; 709/243; 709/244; 713/100; 713/166
(58) Field of Classification Search ......... 709/230, 709/243, 244
 See application file for complete search history.

(56) References Cited

U.S. PATENT DOCUMENTS

| 6,691,249 | B1 | 2/2004 | Barford et al. | |
|---|---|---|---|---|
| 6,738,811 | B1 | 5/2004 | Liang | |
| 6,763,482 | B2 | 7/2004 | Bernklau-halvor | |
| 6,768,721 | B1 * | 7/2004 | Schmitz et al. | 370/248 |
| 6,970,943 | B1 * | 11/2005 | Subramanian et al. | 709/238 |
| 6,990,602 | B1 * | 1/2006 | Skinner et al. | 714/4 |
| 7,002,993 | B1 * | 2/2006 | Mohaban et al. | 370/471 |
| 7,058,861 | B1 | 6/2006 | Adams | |
| 7,191,290 | B1 * | 3/2007 | Ackaouy et al. | 711/119 |
| 7,203,729 | B2 * | 4/2007 | Chen et al. | 709/209 |
| 7,225,343 | B1 | 5/2007 | Honig et al. | |
| 7,492,789 | B2 * | 2/2009 | Shvodian | 370/469 |

| 2002/0124187 | A1 | 9/2002 | Lyle et al. | |
|---|---|---|---|---|
| 2003/0014662 | A1 | 1/2003 | Gupta et al. | |
| 2003/0204632 | A1 | 10/2003 | Willebeek-LeMair et al. | |
| 2003/0225899 | A1 * | 12/2003 | Murphy | 709/230 |

(Continued)

FOREIGN PATENT DOCUMENTS

GB 2372670 8/2002

(Continued)

OTHER PUBLICATIONS

Wikipedia, Cluster (computing), Oct. 8, 2009, pp. 1-19.*

(Continued)

*Primary Examiner*—Hassan Phillips
*Assistant Examiner*—Backhean Tiv
(74) *Attorney, Agent, or Firm*—Perkins Coie LLP

(57) ABSTRACT

A method and system for aggregating configuration information from friend devices is provided. The aggregation system attempts to foil attacks on the privacy of data contributed to a request by aggregating data from a cluster of friend devices in such a way that it is difficult for a device in the cluster and an attacking device outside the cluster to determine the contribution of an individual device to the data. The aggregation system of an initiator device may also determine the cardinality of a parameter so that the corresponding parameter vector can have a size large enough to support the number of possible values. The aggregation system determines the cardinality by counting nonzero hash values of the actual values that are provided by the devices.

18 Claims, 13 Drawing Sheets

U.S. PATENT DOCUMENTS

| | | | |
|---|---|---|---|
| 2004/0093513 | A1 | 5/2004 | Cantrell et al. |
| 2004/0260678 | A1 | 12/2004 | Verbowski et al. |
| 2005/0015639 | A1 | 1/2005 | Cornelius et al. |
| 2005/0155031 | A1 | 7/2005 | Wang et al. |
| 2005/0188268 | A1 | 8/2005 | Verbowski et al. |
| 2005/0198110 | A1 | 9/2005 | Garms et al. |
| 2006/0036708 | A1 | 2/2006 | Yuan et al. |
| 2006/0117310 | A1 | 6/2006 | Daniels |
| 2006/0174160 | A1* | 8/2006 | Kim .......................... 714/18 |
| 2006/0233152 | A1* | 10/2006 | Suda ......................... 370/347 |
| 2007/0091808 | A1* | 4/2007 | Raftelis ..................... 370/235 |
| 2007/0140479 | A1 | 6/2007 | Wang et al. |
| 2007/0143280 | A1 | 6/2007 | Wang et al. |

FOREIGN PATENT DOCUMENTS

| | | |
|---|---|---|
| WO | WO-01/65330 A2 | 9/2001 |
| WO | WO-03/009140 | 1/2003 |

OTHER PUBLICATIONS

"Buffer Overrun In RPC Interface Could Allow Code Execution," Microsoft Security Bulletin MS03-026, Microsoft TechNet, revised Sep. 10, 2003, 8 pages, http://www.micrsoft.com/technet/security/bulletin/MS03-026.mspx?pf=true, [last accessed Jul. 21, 2005].

"Byacc—Berkeley YACC," 1 page, http://dickey.his.com/byacc/byacc.html, [last accessed Jul. 22, 2005].

"Change Auditing Solutions—Tripwire, Inc.," © 2005 Tripwire, Inc., http://www.tripwire.com/, [last accessed Jul. 21, 2005].

"DCE 1.1: Remote Procedure Call," Technical Standard, CAE Specification, © Oct. 1997, Published in the U.K. by The Open Group Oct. 1997, 748 pages.

"Flex—a scanner generator—Table of Contents," GNU Project, Free Software Foundation, last updated Nov. 7, 1998, 1 page, http://www.gnu.org/software/flex/manual/, [last accessed Jul. 21, 2005].

"Snort—the de facto standard for intrusion detection/prevention", 1 page, http://www.snort.org/, [last accessed Jul. 22, 2005].

"Unchecked Buffer in Index Server ISAPI Extension Could Enable Web Server Compromise," Microsoft Security Bulletin MS01-033, Microsoft TechNet, updated Nov. 4, 2003, © 2005 Microsoft Corporation, http://www.microsoft.com/technet/security/bulletin/MS01-033.mspx?pf=true, [last accessed Jul. 21, 2005].

"UrlScan Security Tool," Microsoft TechNet, 8 pages, © 2005 Microsoft Corporation, http://www.microsoft.com/technet/security/tools/urlscan.mspx?pf=true [last accessed Jul. 21, 2005].

"Web-to-Host: Reducing the Total Cost of Ownership," The Tolly Group Total Cost of Ownership White Paper, May 2000, 13 pages, © 2000 The Tolly Group.

Agrawal, Rakesh and Ramakrishnan Srikant, "Privacy-Preserving Data Mining," In Proceedings of ACM SIGMOD 2000.

Aguilera, Marcos K. et al., "Performance Debugging for Distributed Systems of Black Boxes," SOSP'03, Oct. 19-22, 2003, ACM 2003, 16 pages.

Apap, Frank et al., "Detecting Malicious Software by Monitoring Anomalous Windows Registry Accesses," RAID 2002, Zurich, Switzerland, pp. 1-13.

Bashar, Mohd A. et al., "Low-Threat Security Patches and Tools," Proceedings of International Conference on Software Maintenance, Oct. 1-3, 1997, Bari, Italy, IEEE Computer Society, pp. 306-313, © 1997 by The Institute of Electrical and Electronics Engineers, Inc.

Beattie, Steve et al., "Timing the Application of Security Patches for Optimal Uptime," 2002 LISA XVII, Nov. 3-8, 2002, Philadelphia, PA, pp. 101-110.

Benaloh, Josh Daniel Cohen, "Verifiable Secret-Ballot Elections," Dissertation, Yale University, Dec. 1996, 132 pages.

Burgess, Mark, "A Site Configuration Engine," USENIX Computing Systems, vol. 8, No. 3, 1995, pp. 1-29.

Canny, John, "Collaborative Filtering with Privacy," 2002 IEEE Symposium on Security and Privacy, p. 45.

Chaum, David and Torben Pryds Pedersen, "Wallet Databases with Observers," Advances in Cryptology—CRYPTO'92, LNCS 740, pp. 89-105, 1993, © Springer-Verlag Berlin Heidelberg 1993.

Chaum, David, "Untraceable Electronic Mail, Return Addresses, and Digital Pseudonyms," Communications of the ACM, Feb. 1981, vol. 24, No. 2, © 1981 ACM, 8 pages.

Chen, Mike Y. et al., "Pinpoint: Problem Determination in Large, Dynamic Internet Services," In Proceedings of International Conference on Dependable Systems and Networks 2002, 10 pages.

Chen, Shuo et al., "A Data-Driven Finite State Machine Model for Analyzing Security Vulnerabilities," Proceedings of the 2003 International Conference on Dependable Systems and Networks (DSN'03), © 2003 IEEE, 10 pages.

Chen, Zesheng et al., "Modeling the Spread of Active Worms," IEEE INFOCOM 2003, © 2003 IEEE, 11 pages.

Clarke, Ian et al., "Freenet: A Distributed Anonymous Information Storage and Retrieval System," Lecture Notes in Computer Science, Springer-Verlag GmbH, ISSN: 0302-9743, vol. 2009 / 2001, Jun. 2003, 21 pages.

Coney, Lillie et al., "Towards a Privacy Measurement Criterion for Voting Systems," Poster paper, National Conference on Digital Government Research, May 2005.

Couch, Alva L. and Michael Gilfix, "It's Elementary Dear Watson: Applying Logic Programming to Convergent System Management Processes," In Proceedings of LISA XIII 1999, Nov. 7-12, 1999, pp. 121-135.

Cramer, Ronald et al., "A Secure and Optimally Efficient Multi-Authority Election Scheme," In Advances in Cryptology—EUROCRYPT'97, vol. 1233 of Lecture Notes in Computer Science, Springer-Verlag, 1997, pp. 103-118.

Cramer, Ronald et al., "Proofs of Partial Knowledge and Simplified Design of Witness Hiding Protocols," Advances in Cryptology—CRYPTO'94, vol. 839 of Lecture Notes in Computer Science, Springer-Verlag, 1994, pp. 174-187.

Douceur, John R., "The Sybil Attack," IPTPS'02 Workshop, Cambridge, MA, Mar. 2002.

Engler, Dawson et al., "Bugs as Deviant Behavior: A General Approach to Inferring Errors in Systems Code," In Proceedings of ACM Symposium on Operating Systems Principles, Oct. 2001, 23 pages.

EP Search Report, Oct. 14, 2005, 4 pages.

Fiat, Amos and Adi Shamir, "How to Prove Yourself: Practical Solutions to Identification and Signature Problems," Advances in Cryptology—CRYPTO'86, LNCS 263, pp. 186-194, 1987, © Springer-Verlag Berlin Heidelberg 1987.

Fielding, R., et al., "Hypertext Transfer Protocol—HTTP/1.1," Jun. 3, 1996, HTTP Working Group, Internet-Draft, 105 pages.

Forrest, Stephanie et al., "A Sense of Self for Unix Processes," In Proceedings of the 1996 Symposium on Security and Privacy, IEEE Computer Society Press, Los Alamitos, CA, pp. 120-128, 1996, © 1996 IEEE.

Freedman, Michael J. et al., "Introducing Tarzan, a Peer-to-Peer Anonymizing Network Layer," IPTPS 2002, 6 pages.

Fujioka, Atsushi, et al., "A Practical Secret Voting Scheme for Large Scale Elections," Advances in Cryptology AUSCRYPT '92, Dec. 13-16, Gold Coast, Queensland, Australia, Dec. 13-16, 1992, © Springer-Verlag Berlin Heidelberg 1993, pp. 244-251.

Ganger, Gregory R. et al., "Finding and containing enemies within the walls with self-securing network interfaces," Technical Report CMU-CS-03-109, Carnegie Mellon University, School of Computer Science, Jan. 2003, 24 pages.

Goldschlag, David et al., "Onion Routing for Anonymous and Private Internet Connections," Jan. 28, 1999, CACM Feb. 1999, 5 pages.

Handley, Mark et al., "Network Intrusion Detection: Evasion, Traffic Normalization, and End-to-End Protocol Semantics," presentation, USENIX Security Symposium 2002, 31 pages.

Hsieh, Hung-Yun and Raghupathy Sivakumar, "A Transport Layer Approach for Achieving Aggregate Bandwidths on Multi-homed Mobile Hosts," MOBICOM'02, Sep. 23-26, 2002, Atlanta, Georgia, © 2002 ACM, 12 pages.

Jakobsson, Markus et al., "Making Mix Nets Robust for Electronic Voting by Randomized Partial Checking," Feb. 1, 2002, USENIX Security'02, pp. 339-353, 2002.

Kamara, Seny et al., "Analysis of Vulnerabilities in Internet Firewalls," Computers & Security, vol. 22, No. 3, Copyright Elsevier 2003, pp. 214-232.

Katz, Jonathan et al., "Cryptographic Counters and Applications to Electronic Voting," EUROCRYPT 2001, LNCS 2045, pp. 78-92, 2001, © Springer-Verlag Berlin Heidelberg 2001.

KaZaa, http://www.kazaa.com, 1 page, [last accessed Jul. 22, 2005].

Keller, Alexander and Christian Ensel, "An Approach for Managing Service Dependencies with XML and the Resource Description Framework," IBM Research Report, RC 22307, Jan. 15, 2002, Computer Science, IBM Research Division, pp. 1-17.

Kissner, Lea and Dawn Song, "Privacy-Preserving Set Operations," Feb. 2005—Last modified Jun. 2005, Carnegie Mellon University, School of Computer Science, CMU-CS-05-113.

Klensin, J., "Simple Mail Transfer Protocol," RFC: 2821, Network Working Group, Standards Track, Apr. 2001, © The Internet Society 2001, 70 pages.

Kohler, Eddie et al., "Programming language techniques for modular router configurations," Technical Report LCS-TR-812, MIT Laboratory for Computer Science, 2000, pp. 1-22.

Kremenek, Ted and Dawson Engler, "Z-Ranking: Using Statistical Analysis to Counter the Impact of Static Analysis Approximations," Proceedings of the 10th Annual International Static Analysis Symposium, Jun. 2003, 21 pages.

Larsson, Magnus and Ivica Crnkovic, "Configuration Management for Component-based Systems," In Proceedings of International Conference on Software Engineering, May 2001, 5 pages.

Liblit, Ben et al., "Bug Isolation via Remote Program Sampling," PLDI '03, Jun. 9-11, 2003, San Diego, California, © 2003 ACM, pp. 141-154.

Microsoft Security Bulletin MS02-039, "Buffer Overruns in SQL Server 2000 Resolution Service Could Enable Code Execution (Q323875)," Microsoft TechNet, updated Jan. 31, 2003, 6 pages.

Moore, David et al., "Code-Red: a case study on the spread and victims of an Internet worm," CAIDA, San Diego Supercomputer Center, University of California San Diego, 12 pages, ACM Internet Measurement Workshop 2002.

Moore, David et al., "Inside the Slammer Worm," Slammer Worm Dissection, IEEE Security & Privacy, Published by IEEE Computer Society, © 2003 IEEE, pp. 33-39.

Moore, David et al., "Internet Quarantine: Requirements for Containing Self-Propagating Code," IEEE INFOCOM 2003, © 2003 IEEE, 10 pages.

Noar, Moni, "Bit Commitment Using Pseudo-Randomness," Feb. 25, 2001, IBM Almaden Research Center, Journal of Cryptology, vol. 4, Proceedings of CRYPTO 1989.

Osterlund, Robert, "PIKT: Problem Informant/Killer Tool," Proceedings of the 14th Systems Administration Conference, 2000 LISA XIV, Dec. 3-8, 2000, New Orleans, Louisiana, © 2000 by The USENIX Association, pp. 147-165.

Paxson, Vern, "Bro: A System for Detecting Network Intruders in Real-Time," Dec. 14, 1999, Computer Networks, 31 (23-24), pp. 2435-2463.

Postel, J. and J. Reynolds, "File Transfer Protocol (FTP)," RFC: 959, Network Working Group, Oct. 1985, pp. 1-69.

Postel, J. and J. Reynolds, "Telnet Protocol Specification," RFC: 854, May 1983, Network Working Group.

Przydatek, Bartosz et al., "SIA: Secure Information Aggregation in Sensor Networks," SenSys '03, Nov. 5-7, 2003, Los Angeles, California, © 2003 ACM, pp. 255-265.

Razmov, Valentin and Daniel R. Simon, "Practical Automated Filter Generation to Explicitly Enforce Implicit Input Assumptions," In Proceedings of the 17th Annual Computer Security Applications Conference, New Orleans, Louisiana, Dec. 2001, 11 pages.

Redstone, Joshua A. et al., "Using Computers to Diagnose Computer Problems," Proceedings of HotOS IX: The 9th Workshop on Hot Topics in Operating Systems, Lihue, Hawaii, May 18-21, 2003, USENIX Association, pp. 91-96.

Reiter, Michael K. and Aviel D. Rubin, "Crowds: Anonymity for Web Transactions," ACM Transactions on Information and System Security, vol. 1, No. 1, Nov. 1998, pp. 66-92, © 1998 ACM.

Rescorla, Eric, "Security holes . . . Who cares?," In Proceedings of USENIX Security Symposium, Aug. 2003, 17 pages.

Ritchey, Ronald W. and Paul Ammann, "Using Model Checking to Analyze Network Vulnerabilities," Security and Privacy 2000, 2000 IEEE Symposium, © 2000 IEEE, pp. 156-165.

Schulzrinne, H. et al., "RTP: A Transport Protocol for Real-Time Applications," Jan. 1996, Network Working Group, RFC 1889, Standards Track, 75 pages.

Shankar, Umesh, "Active Mapping: Resisting NIDS Evasion Without Altering Traffic," Dec. 2002, Report No. UCB//CSD-2-03-1246, Computer Science Division (EECS), University of California Berkeley, 38 pages.

Shannon, C.E., "A Mathematical Theory of Communication," Reprinted with corrections from The Bell System Technical Journal, vol. 27, pp. 379-423, 623-656, July, Oct. 1948.

Sharpe, Richard, "Just what is SMB?" Oct. 8, 2002, 9 pages http://samba.anu.edu.au/cifs/docs/what-is-smb.html [last accessed Jul. 26, 2005].

Silver, Michael A. and Leslie Fiering, "Desktop and Notebook TCO Updated for the 21st Century," Sep. 12, 2003, Gartner Teleconference, http://www.dataquest.com/teleconferences/asset_ 47431.jsp, [last accessed Jul. 25, 2005].

Singh, Sumeet et al., "The EarlyBird System for Real-Time Detection of Unknown Worms," Technical Report CS2003-0761, University of California at San Diego, 2003, pp. 1-6.

Solomon, David A. and Mark E. Russinovich, "Chapter 5—Management Mechanisms," Inside Microsoft Windows 2000, Third Edition, Microsoft Press, pp. 215-276, © 2000 by David A. Solomon and Mark E. Russinovich.

Staniford, Stuart et al., "How to Own the Internet in Your Spare Time," Proceedings of the 11th USENIX Security Symposium, San Francisco, California, Aug. 5-9, 2002, 20 pages.

Traugott, Steve and Joel Huddleston, "Bootstrapping an Infrastructure," Proceedings of the 12th Systems Administration Conference, LISA XII'98, Dec. 6-11, 1998, Boston, Massachusetts, pp. 181-196, USENIX.

Tripwire, Inc., http://www.tripwire.com/, Accessed Oct. 31, 2005.

Wagner, David, "Resilient Aggregation in Sensor Networks," SASN'04, Oct. 25, 2004, Washington, DC, © 2004 ACM.

Wang, Helen et al., "Friends Troubleshooting Network, Towards Privacy-Preserving, Automatic Troubleshooting," Feb. 2004, IPTPS'04, Springer.

Wang, Helen J. et al, "Automatic Misconfiguration Troubleshooting with PeerPressure," 6th Symposium on Operating Systems Design & Implementation, 2004, USENIX.

Wang, Helen J. et al., "PeerPressure: A Statistical Method for Automatic Misconfiguration Troubleshooting," Nov. 2003, Microsoft Research Technical Report MSR-TR-2003-80, Microsoft Corporation, 13 pages.

Wang, Yi-Min et al., "Persistent-state Checkpoint Comparison for Troubleshooting Configuration Failures," Apr. 4, 2003, Microsoft Technical Report MSR-TR-2003-28, Microsoft Research, Microsoft Corporation, IEEE International Conference on Dependable Systems and Networks, Jun. 2003, © 2003 IEEE.

Wang, Yi-Min et al., "STRIDER: A Black-Box, State-Based Approach to Change and Configuration Management and Support," Proceedings of the 17th Large Installation Systems Administration Conference, Oct. 26-31, 2003, San Diego, CA, © 2003 by The USENIX Association, pp. 159-171.

Weaver, Nicholas C., "Warhol Worms: The Potential for Very Fast Internet Plagues," Regents of the University of California, 2001, 9 pages, http://www.csua.berkeley.edu/~nweaver/warhol.html, [last accessed Aug. 10, 2007].

Weaver, Nicholas et al., "Large Scale Malicious Code: A Research Agenda," Mar. 2003, 43 pages.

Williamson, Matthew M., "Throttling Viruses: Restricting propagation to defeat malicious mobile code," HPL-2002-172, Jun. 17, 2002, HP Laboratories Bristol, © Hewlett-Packard Company 2002, 7 pages.

\* cited by examiner

AGGREGATING INFORMATION FROM A CLUSTER OF PEERS

CROSS-REFERENCE TO RELATED APPLICATION(S)

This patent application is related to U.S. patent application Ser. No. 11/311,893, entitled "Determining Cardinality of a Parameter Using Hash Values," and U.S. patent application Ser. No. 11/311,916, entitled "Privacy-Preserving Data Aggregation Using Homomorphic Encryption," both of which are being filed concurrently and which are hereby incorporated by reference.

BACKGROUND

An ever-increasing number of applications (i.e., computer software) with various features are available to users of personal computers. Users can tailor the operation of these applications to suit their needs by specifying various configuration parameters. For example, a browser application may have a configuration parameter that provides a URL of a web page that is displayed initially whenever the browser application starts (i.e., "a home page"). The browser application may also have configuration parameters that identify what programs are to be invoked to process certain types of content (e.g., a "jpeg" file) and that contain passwords of the user that are to be used when the application connects to various servers. The values of the configuration parameters can be stored in application-specific configuration files such as UNIX resource files, or can be stored in a central registry such as the Windows® registry file. The applications access these files to retrieve the values of the configuration parameters.

If certain configuration parameters have incorrect values, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect displaying of the graphics content. Similarly, if a password configuration parameter has the wrong password, then the failure to connect to the server will be the undesired behavior.

Because of the complexity of applications and their large number of configuration parameters, it can be very time-consuming to troubleshoot which configuration parameters are at fault for causing an application to exhibit the undesired behavior. Most users of personal computers have difficulty performing this troubleshooting. As a result, users typically rely on technical support personnel to assist in the troubleshooting. Not only is this troubleshooting expensive but also users may experience a significant productivity loss as a result of their inability to effectively use an application that is exhibiting an undesired behavior.

Typically, technical support personnel use an ad hoc approach to troubleshoot configuration problems. The personnel using knowledge gained from experiencing similar problems will try to narrow in on the at-fault configuration parameter. This ad-hoc approach can take a considerable amount of time and even longer if it is a combination of configuration parameters whose values are incorrect. In some cases, the technical support personnel may compare the values of the configuration parameters to "ideal" values for that application. Because of the large number of configuration parameters available and large number of possible values for each configuration parameter, many of the configuration parameters will have no "ideal" value. Thus, technical support personnel may still need to review the values of all the configuration parameters that could possibly be at-fault configuration parameters.

A troubleshooting system for automatically identifying a configuration parameter that is at fault for causing an application to exhibit an undesired behavior is described in U.S. patent application Ser. No. 10/918,786, entitled "Method and System of Troubleshooting a Misconfiguration of a Computer System based on Configurations of Other Computer Systems" and filed on Aug. 13, 2004, which is hereby incorporated by reference. That troubleshooting system collects configuration information (e.g., configuration parameter names and their values) from computer systems that may have the same application installed. The troubleshooting system then analyzes the configuration parameters of the application that is exhibiting the undesired behavior and the configuration parameters collected from the other computer systems. Based on this analysis, the troubleshooting system identifies which configuration parameter is likely to be at fault for causing the undesired behavior.

The retrieving of configuration information from other computer systems may raise privacy and integrity issues. The privacy issues may relate to configuration information, such as listings of web sites visited, passwords, and so on, that a user may not want to divulge. The integrity issues arise when a computer system lies about its configuration information. The lie may be promulgated because the user of the computer system is malicious or because the integrity of the computer system has been compromised such as by a virus or worm.

A system for retrieving information from computer systems in a way that addresses privacy and integrity issues is described in U.S. patent application Ser. No. 10/918,086, entitled "Method and System for Collecting Information from Computer System based on a Trusted Relationship," and filed on Aug. 13, 2004, which is hereby incorporated by reference. The retrieval system is implemented on a network of devices that communicate with each other via a secure communications link. Each device is directly connected to one or more "friend" devices that it trusts. The retrieval system operates by forwarding a request for data from one friend device to another friend device. Each friend device may optionally add data to the request until all the requested data is added. The request is then returned to the device that initiated the request. The retrieval system defines requests that do not include a history of the devices through which a request has traveled; that is, the requests are "historyless." As a result, a device will only know for sure that a particular request traveled through the friend devices from which it received the request and to which it forwarded the request. In addition, because devices may or may not add data to a request, a device that receives a request from a friend device will not know whether the request includes data of the friend device. Because each device selects the next device to which to send a request, the requests do not identify the devices that will add data; that is, the requests are "futureless."

This retrieval system may, however, be susceptible to privacy-compromising attacks such as gossip attacks and polling attacks. A gossip attack occurs when a device contributes data to a request and the previous friend device and the next friend device collude to determine the data contributed by the device. A polling attack occurs when a friend device repeatedly sends fake requests for data to a device indicating that data from only one more device is needed to determine the data contributed by the device. To help foil both of these types of attacks, the device may only contribute data to the request based on predetermined probability function. Nevertheless, the attacking "friend" devices may still be able to guess the contributed data using some statistical analysis.

SUMMARY

A method and system for aggregating configuration information from friend devices is provided. The aggregation system attempts to foil attacks on the privacy of data contributed to a request by aggregating data from a cluster of friend devices in such a way that it is difficult for a device in the cluster and an attacking device outside the cluster to determine the contribution of an individual device to the data. When a device receives a request for data, the aggregation system of that device identifies a cluster of friend devices whose data is to be aggregated. The aggregation system of the device notifies the devices of the cluster to make a contribution to the request. Each cluster device determines its contribution, divides its contribution into shares, and sends a share of its contribution to every other cluster device. The sum of the shares equals the contribution of the cluster device. Once a cluster device receives the shares from all other cluster devices, it totals the shares of the cluster devices and sends the total of the shares to an exit cluster device. The exit cluster device then aggregates the totals received from each cluster device by summing the totals. The exit cluster device may then forward the request that now includes the aggregated data to another friend device.

The aggregation system of an initiator device may determine the cardinality of a parameter so that the corresponding parameter vector can have a size large enough to support the number of possible values. The aggregation system determines the cardinality by sending a request for devices to contribute their hash values, using a hash function, of the actual value of the parameter. The cardinality of the hash values serves as an upper-bound on the cardinality of the parameter. The hash values can be aggregated from a cluster of devices using a hash value contribution vector as described above since its cardinality is known. When the initiator device receives the contribution of the hash values, it counts the number of non-zero contributions and uses that as the cardinality of the parameter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
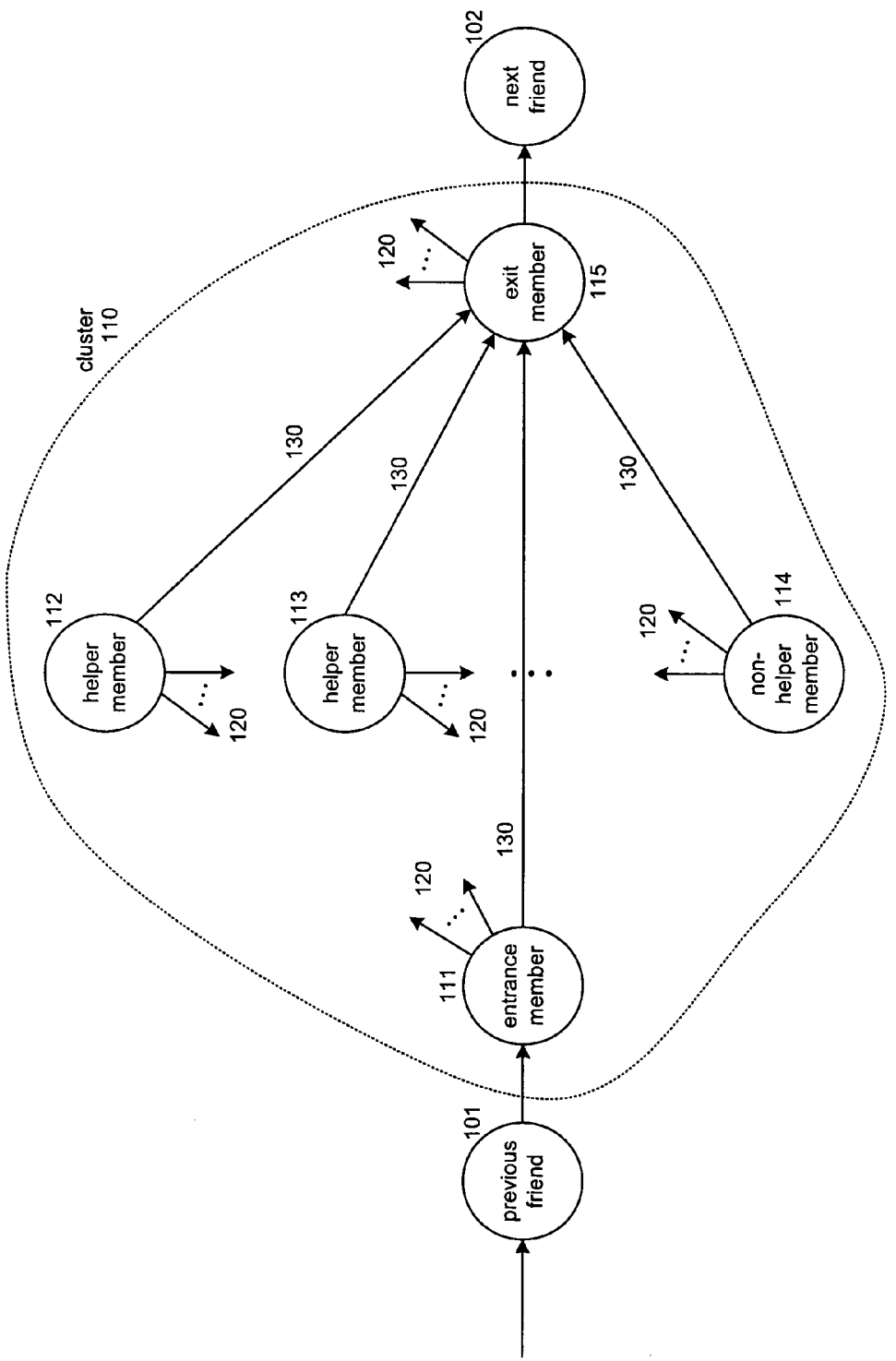
FIG. 1 is a diagram that illustrates the aggregation of the contributions of devices of a cluster in one embodiment.

A method and system for aggregating configuration information from friend devices is provided. In one embodiment, the aggregation system of a device attempts to foil attacks on the privacy of data contributed to a request by aggregating data from a cluster of friend devices in such a way that no device in the cluster and no attacking device outside the cluster can determine the contribution of an individual device to the data. When a device receives a request for data, the aggregation system of that device identifies a cluster of friend devices whose data is to be aggregated. For example, the requested data may be a configuration parameter that specifies a default printer. The devices of the cluster include "friend" devices of the device that received the request, which is referred to as the "entrance" device. The aggregation system of the entrance device notifies the devices of the cluster to make a contribution to the request. Each cluster device determines its contribution, divides its contribution into shares, and sends a share of its contribution to every other cluster device. The sum of the shares equals the contribution of the cluster device. Because each other cluster device only has a share of the cluster device contribution, the cluster devices cannot determine the contribution absent some collusion among all the other cluster devices. Once a cluster device receives the shares from all other cluster devices, it totals the shares of the cluster devices and sends the total of the shares to an exit cluster device. The exit cluster device then aggregates the totals received from each cluster device by summing the totals. Because each cluster device totals the shares that it receives and only provides that total to the exit cluster device, the exit cluster device cannot determine the individual shares that contributed to the total. As a result, the exit cluster device cannot determine the contribution of any cluster device. The exit cluster device may then forward the request that now includes the aggregated data to another friend device. The other friend device, even if it colluded with the device that forwarded the request to the entrance cluster device in a gossip attack, could only determine the aggregate data contributed by the cluster devices and not the data contributed by an individual cluster device. In addition, the device that forwarded the request to the entrance cluster device in a polling attack could not know if the data was contributed by the entrance cluster device or some other cluster device.

An example will help illustrate the operation of the aggregation system. Assume that a request is received by an entrance cluster device for the value of the default printer configuration parameter. In this example, the default configuration parameter may have a cardinality of five, which means that the default printer has five possible values (e.g., "lpt1:" through "lpt5:"). The entrance device then forwards a request to each cluster device to aggregate their values for the configuration parameter. Each cluster device upon receiving the request determines its value for the default printer configuration parameter and generates a contribution vector. A contribution vector has a number of elements equal to the cardinality of the configuration parameter. Thus, the contribution vector for the default printer configuration parameter has five elements. If a cluster device has the value of "ptr3:" for the default printer configuration parameter, then the device would have a contribution vector of "00100" indicating that its value is "ptr3:" and it will contribute a count of one to the third element. The cluster device then divides its contribution vector into share contribution vectors that are to be distributed to the other cluster devices. The sum of the share contribution vectors equals the contribution vector. If the cluster of this example has five devices, then each cluster device divides its contribution vector into four share contribution vectors. An example of the dividing of the contribution vector of a cluster device that contributes a count of one to the third element (e.g., "lptr3:") is provided in Table 1.

TABLE 1

|       |       | Element |    |    |    |    |
|-------|-------|---------|----|----|----|----|
|       |       | 1       | 2  | 3  | 4  | 5  |
| Share | 1     | 3       | 4  | 2  | −1 | 0  |
|       | 2     | 5       | −3 | −2 | −5 | −3 |
|       | 3     | 10      | −2 | −4 | 2  | −2 |
|       | 4     | −18     | 1  | 5  | 4  | 5  |
|       | Total | 0       | 0  | 1  | 0  | 0  |

The device creates four share contribution vectors as indicated by rows 1-4 with five elements each as indicated by columns 1-5. The sum of each element of the share contribution vectors (i.e., the total of each column) equals the contribution vector as indicated by row "total." For example, the first elements of the share contribution vectors as indicated by column 1 are 3, 5, 10, and −18 and their sum is 0, and the third elements of the share contribution vectors as indicated by column 3 are 2, −2, −4, and 5 and their sum is 1.

The exit cluster device needs to know the number of cluster devices that contributed their data to the request so that it can correctly calculate the aggregate contribution by dividing the total of the contribution vectors by that number. Each cluster device also contributes to a single element "helper" contribution vector indicating whether it is contributing data to the request. A cluster device that does not contribute data to the request (i.e., does not help) may use a contribution vector with all zero elements and divide it into share contribution vectors as described above. Since the contribution vector is all zeros, it will have no impact on the aggregate contribution. Moreover, because its configuration parameter contribution vector is divided into share contribution vectors and its helper contribution vector is also divided into share contribution vectors, no other cluster device will know whether that cluster device contributed or not. When the exit cluster device sums the total helper contribution vectors, it knows the number of cluster devices that contributed and can use that number to generate the correct aggregate contribution vector for the cluster.

In one embodiment, the aggregation system of an initiator device determines the cardinality of a configuration parameter so that the corresponding configuration vector can have a size large enough to support the number of possible values. The aggregation system determines the cardinality by sending a request for devices to contribute their hash values, using a hash function, of the value of the configuration parameter. The cardinality of the hash values serves as an upper-bound on the cardinality of the configuration parameter. The hash values can be aggregated from a cluster of devices using a hash value contribution vector since its cardinality is known. The request for hash values may be forwarded from friend device to friend device by the retrieval system of U.S. patent application Ser. No. 10/918,086, entitled "Method and System for Collecting Information from Computer System based on a Trusted Relationship," and filed on Aug. 13, 2004. When the initiator device receives the contribution of the hash values, it counts the number of non-zero contributions and uses that as the cardinality of the configuration parameter. For example, when determining the cardinality of the default printer configuration parameter, the initiator device may send a request for hash values using a hash function that has a cardinality of 10. The resulting contribution vector may be "25, 0, 1, 5, 0, 0, 4, 3, 0, 1." Because the contribution vector has six nonzero elements, the cardinality for the default printer configuration is assumed to be six.

Although the aggregation system now knows the cardinality, it does not know the actual values. The aggregation system of the initiator device can collect the actual values of the configuration parameter by sending a request to the same friend devices to which it sent the hash value request. Each of the same devices that contributed their hash value contributes their actual values.

The aggregation system may use the cardinalities and the distributions of hash values of the configuration parameters to determine whether the value of a configuration parameter may be at fault for causing an application to exhibit an undesired behavior. For example, if a configuration parameter with a cardinality of 10 with one hash value has 99% percent of the count, then the aggregation system may assume that the actual value corresponding to that hash value is the ideal value for the configuration parameter. In such a case, the aggregation system may want to collect only the actual value that corresponds to that hash value. As another example, if a configuration parameter has a cardinality of 100 with each of the hash values having approximately 1% of the count, the aggregation system may assume that this configuration parameter is unlikely to be at fault because its actual value can vary widely. As a result, the aggregation system may not bother collecting the actual values for this configuration parameter.

Because collisions can occur with hash functions, the initiator device cannot be sure of the cardinality of the configuration parameter. For example, the hash function may happen to have the property that the default printer values of "lpt4:" and "lpt5:" may both hash to the same value of zero and both contribute to the count of 25 in the contribution vector provided above. In such a case, the cardinality would be undercounted. To improve the accuracy of the cardinality, the initiator device may provide multiple hash functions and request that each contributing device apply each of the hash functions to its value to generate multiple hash values. Once the initiator device receives the hash values for the hash functions, it can count the non-zero elements for each hash function and use the highest count as the cardinality. The use of multiple hash functions increases the chances of having at least one hash function with no collisions. Alternatively, the initiator device may increase the cardinality of hash values, that is, increase the range of the hash function, to reduce the chances of a collision.

In one embodiment, cluster devices that are requested to provide their actual values corresponding to a hash value of a configuration parameter may divide their actual value into share contribution vectors. For example, if the request identifies three hash values for a configuration parameter, then each cluster device will generate a contribution vector with three elements with one element being set to its actual value (e.g., 0, "msn.com," 0). The cluster device then divides the contribution vector into share contribution vectors, which it sends to the other cluster devices as described above. The bits of non-numeric elements may be considered as a binary integer. When the exit device receives the total contribution vectors for each cluster device, it determines the actual values by dividing the aggregate values by the number of contributors for each actual value.

Even though multiple hash functions may each have a large range of hash values, a collision may still occur for each hash function. In such a case, an exit cluster device may be able to identify problems with the aggregation. For example, if the division has a remainder, then the cluster devices contributed different actual values indicating a collision of actual values. Even if the division has no remainder, the actual value may be nonsensical indicating that a collision occurred. For example, if the configuration parameter is a URL, then an invalid high-level domain (e.g., "msn.cxx") or a non-ASCII string may indicate a collision. When a collision is indicated, it is reported to the initiator device. The initiator device may select a new set of hash functions and restart the process of determining the cardinality in hopes that collisions will be avoided.

FIG. 1 is a diagram that illustrates the aggregation of the contributions of devices of a cluster in one embodiment. Initially, a device 101 forwards a request to collect contributions to an entrance cluster device 111, also referred to as a member of the cluster. In one embodiment, the cluster 110 is dynamically created when a request is received by a device. The entrance member may be responsible for creating the cluster and requesting each member to forward its contribution to the request. The entrance member sends invitations to its friend devices requesting that they join the cluster. Each friend device that accepts the invitation becomes a member. After the members are identified, the entrance member sends a list of the members to each member and requests each member to participate in an election of an exit member for the cluster. The list may include the address and the public key of each member along with a unique sequential number assigned to that member by the entrance member. Upon receiving the list, each member sends a randomly generated nonce to each other member. When a member receives a nonce from each other member, that member calculates a sum of the nonces and determines the remainder of the sum divided by the number of members. That remainder identifies the member that is elected to be the exit member. Since each cluster member receives the nonces from all other members and receives the same list from the entrance member (i.e., that assigns a unique identifier to each member), each member elects the same member as the exit member. In this example, friend devices 112-115 have accepted the invitation to become members. The members elected a friend device 115 to be the exit member. Some cluster members 112 and 113 plan to contribute and thus become helper members, and other cluster members 114 plan on not contributing and thus become non-helper members. A non-helper member generates a contribution vector of all zeros so that it effectively contributes nothing to the aggregate.

After the exit member is elected, each member generates its contribution vector and then creates a share contribution vector for each other member. Each member then sends 120 a share contribution vector to each other member. Upon receiving a share contribution vector from each other member, each member totals the share contribution vectors into a total contribution vector. Each cluster member then forwards 130 its total contribution vector to the exit member. Upon receiving the total contribution vector from each member, the exit member sums the total contribution vectors into an aggregate contribution vector. The exit member then forwards the request along with the aggregate contribution vector and the number of members that contributed to a friend device 102. Although the exit member could serve as the entrance member of the next cluster, the exit member may not have sufficient friend devices that were not members of the previous cluster to form a new cluster. One skilled in the art will appreciate that an entrance member may perform the manager member function or may delegate that function to a friend device. Also, the exit member may perform the aggregator member function or may delegate that function to a friend device.

In one embodiment, a member that does not have any friend devices outside of the cluster may withdraw as a candidate to be elected exit member. By withdrawing as a candidate, the member avoids having to backtrack to find a device with a friend device. Also, the exit member may indicate that the previous device was the entrance member so that the data of the request can be returned to the entrance member to find its way back to the initiator device.

In one embodiment, the aggregation system attempts to foil collusion between an entrance member and an exit member by limiting the number of friend devices that can become members. If all or most of the members decide to help, then the colluding members can guess with a high certainty that a given member runs a certain application. To foil this collusion, the aggregation system allows members to adapt their probability of making a contribution (i.e., helping) based on the cluster size and desired privacy. In general, for smaller clusters and improved privacy, a member uses a lower probability. If, however, a member uses a low probability of making a contribution, then the number of clusters that are needed to collect the data increases.

In one embodiment, each friend device that is invited to join a cluster randomly decides whether to accept the invitation with a probability close to one-half. The members participate in an aggregation to calculate the number of members that have decided to make a contribution (e.g., by sending share contribution vectors indicating their decision to each other member, which are totaled and sent to the entrance member for aggregation). If more than half the members decide to make a contribution, the process is repeated until fewer than half the members have decided to make a contribution.

Figure 2:
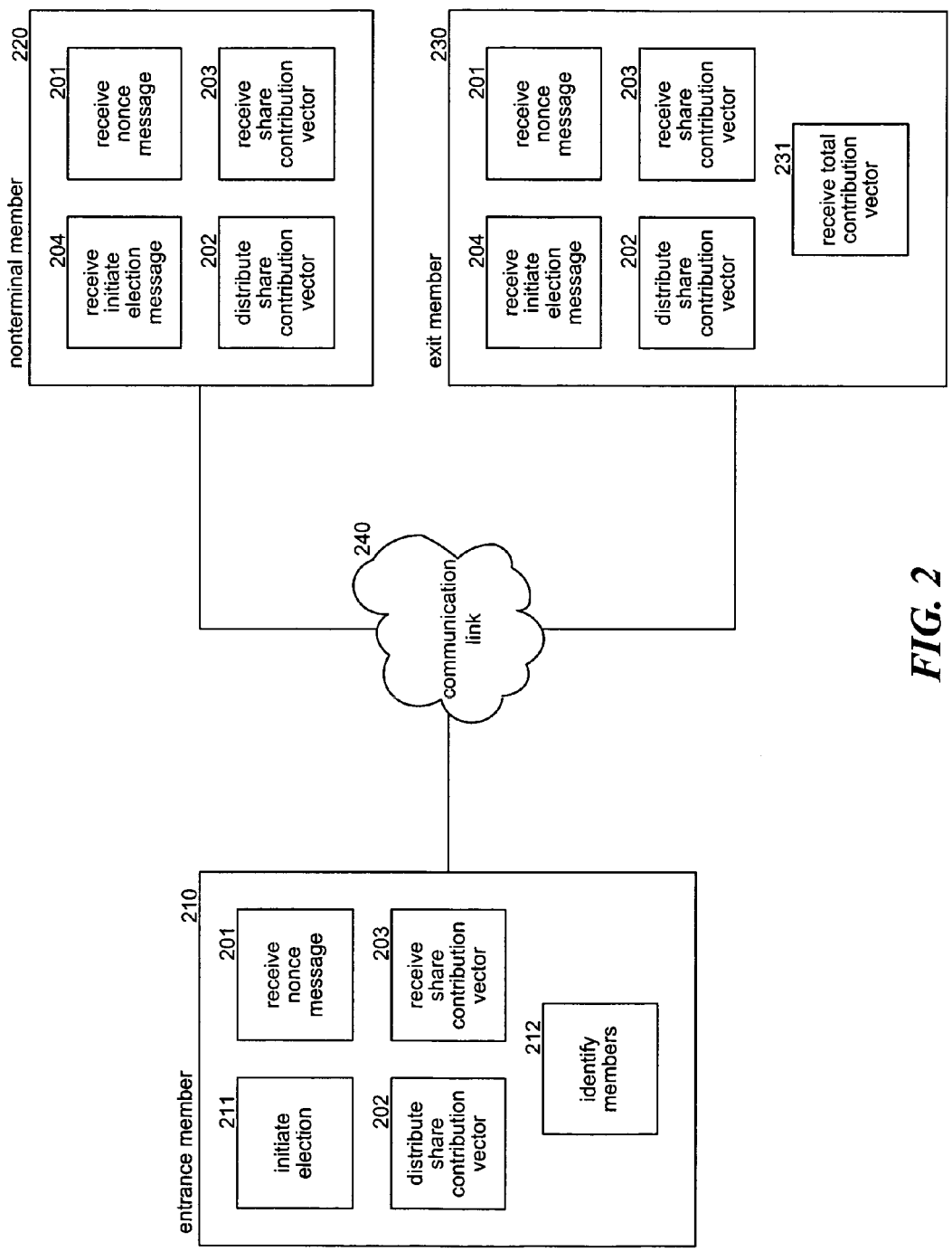
FIG. 2 is a block diagram that illustrates components of the aggregation system in one embodiment.

FIG. 2 is a block diagram that illustrates components of the aggregation system in one embodiment. The devices 210, 220, and 230, which are connected via a communication link 240, contain the components of the aggregation system. In this example, the devices are shown containing the components that are appropriate for their role as entrance member, non-terminal member, or exit member. Each device includes a receive nonce message component 201, a distribute share contribution vector component 202, and a receive share contribution vector component 203. A non-terminal member and the exit member include a receive initiate election message component 204. The entrance member includes an initiate election component 211 and an identify members component 212. The exit member includes a receive total contribution vector component 231. The identify members component sends invitations to join the cluster to friend devices of the entrance member and identifies those friend devices that have accepted the invitation. The identify members component then invokes the initiate election component to send an initiate election message to each other member. The message may identify each member and may include the address and public key of that member along with a sequential identifier assigned to that member by the entrance member. The receive initiate election message component is invoked upon receiving a message from the entrance member to initiate an election. That component distributes a randomly generated nonce to each other member. The receive nonce message component receives the nonce messages from the other members. When all the nonce messages have been received, the component elects an exit member. The distribute share contribution vector component generates the contribution vector for the member and generates and sends the share contribution vectors to each other member. The receive share contribution vector component generates a total of the share contribution vectors that it receives and provides that total contribution vector to the exit member. The receive total contribution vector component receives the total contribution vector from each member and aggregates the total contribution vectors into an aggregate contribution vector for the cluster.

The computing devices on which the aggregation system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the aggregation system. In addition, the data structures may be stored or transmitted via a data transmission medium, such as a signal on a communications link. Various communications links may be used to connect components of the system, such as the Internet, a local area network, a wide area network, a point-to-point dial-up connection, a cell phone network, and so on.

Embodiments of the aggregation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The devices may include cell phones, personal digital assistants, smart phones, personal computers, programmable consumer electronics, digital cameras, and so on.

The aggregation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

One skilled in the art will appreciate that functions described as being performed by the entrance member and the exit member of a cluster may be performed by other devices. For example, the function of managing the identifying of members of a cluster and the initiating of the election of a cluster exit member may be performed by a device other than the entrance device. As another example, one member may serve to aggregate the total contribution vectors and another member may serve as the exit member. In such a case, the aggregating member can forward the aggregate to the exit member.

Figure 3:
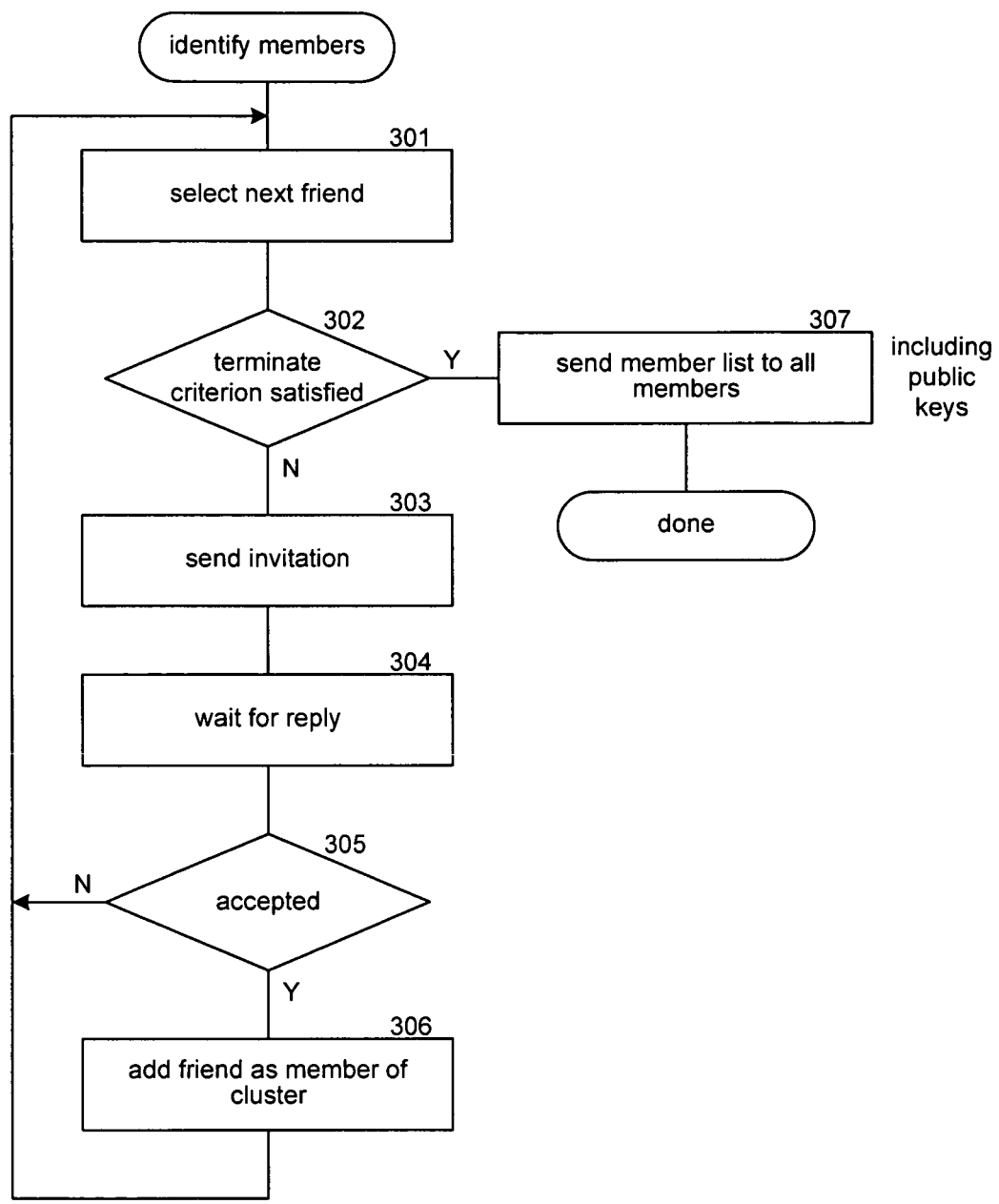
FIG. 3 is a flow diagram that illustrates the processing of the identify members component of the aggregation system in one embodiment.

FIG. 3 is a flow diagram that illustrates the processing of the identify members component of the aggregation system in one embodiment. The identify members component is invoked by the entrance member to identify friend devices that agree to join the cluster. In blocks 301-306, the component loops sending an invitation to friend devices until a termination criterion is satisfied. In block 301, the component selects the next friend device. In decision block 302, if a termination criterion has been satisfied, then the component continues at block 307, else the component continues at block 303. The termination criterion may indicate to terminate when all the friend devices have already been selected or when a sufficient number of friend devices have agreed to join the cluster. In block 303, the component sends an invitation to join the cluster to the selected friend device. In block 304, the component waits for a reply from the selected friend device. In decision block 305, if the reply indicates that the selected friend device has accepted the invitation, then the component continues at block 306, else the component loops to block 301 to select the next friend device. In block 306, the component adds the selected friend device as a member of the cluster and then loops to block 301 to select the next friend device. In block 307, the component invokes the initiate election component to initiate the election of the exit member. The component then completes.

Figure 4:
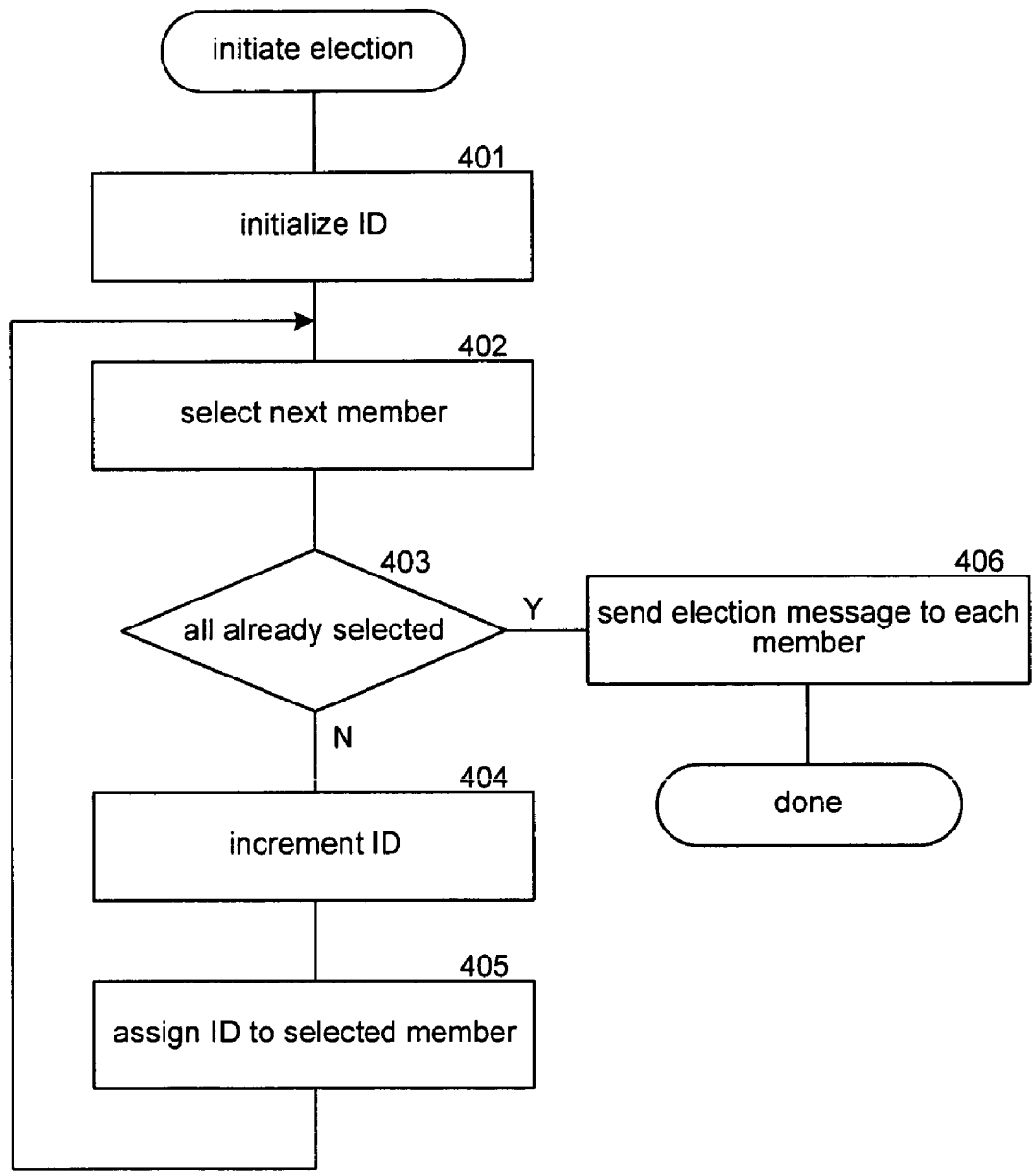
FIG. 4 is a flow diagram that illustrates the processing of the initiate election component of the aggregation system in one embodiment.

FIG. 4 is a flow diagram that illustrates the processing of the initiate election component of the aggregation system in one embodiment. The initiate election component assigns a unique sequential identifier (e.g., starting at 0) to each cluster member and then sends a list of the members to each member. The member list includes the address, public key, and sequential identifier of each member of a cluster. In block 401, the component initializes the sequential identifier. In blocks 402-405, the component loops assigning a sequential identifier to each cluster member other than the entrance member. The entrance member is not eligible to be the exit member because it would be able to easily identify the aggregate contribution of the cluster. The entrance member, however, does participate in the election so that it knows which member is elected as the exit member. In block 402, the component selects the next member. In decision block 403, if all the members have already been selected, then the component continues at block 406, else the component continues at block 404. In block 404, the component increments the identifier. In block 405, the component assigns the identifier to the selected member and then loops to block 402 to select the next member. In block 406, the component sends an initiate election message that includes the member list to each member.

Figure 5:
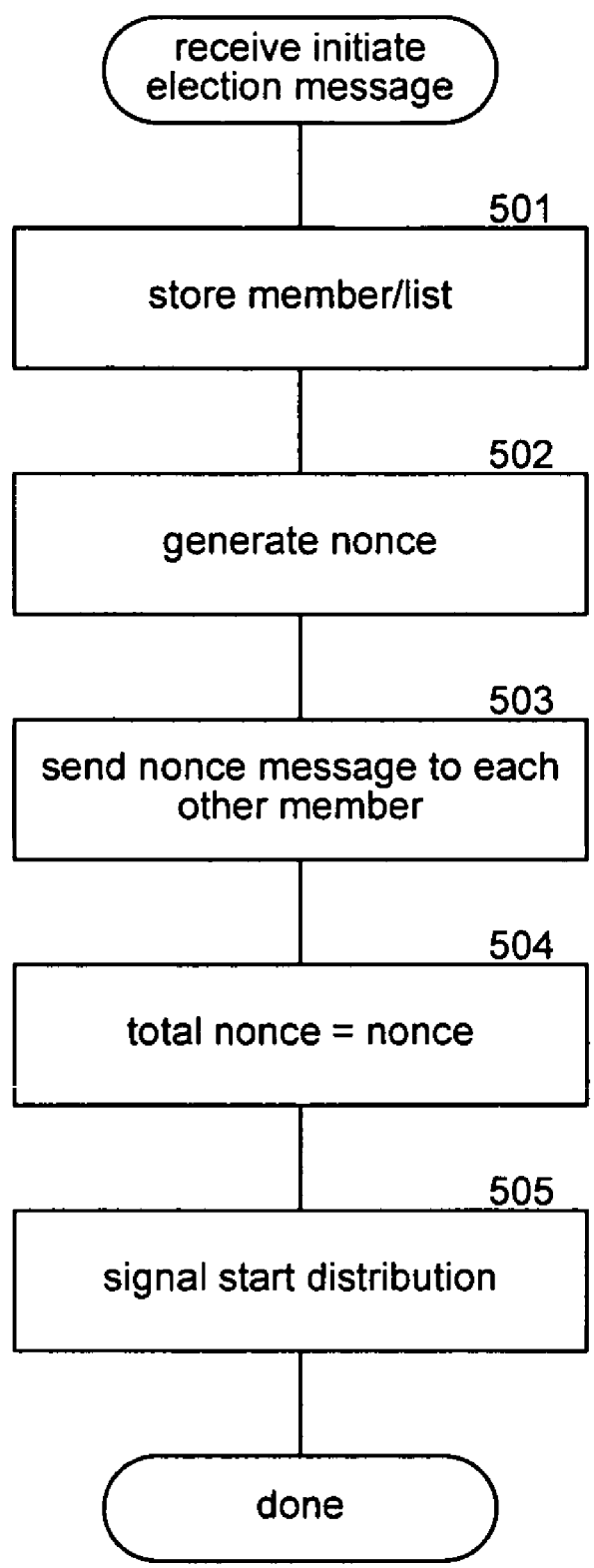
FIG. 5 is a flow diagram that illustrates the processing of the receive initiate election message component of the aggregation system in one embodiment.

FIG. 5 is a flow diagram that illustrates the processing of the receive initiate election message component of the aggregation system in one embodiment. The component stores the member list, sends its nonce to the other members, and then signals to start the distribution of the share contribution vectors. In block 501, the component stores the member list received in the initiate election message. In block 502, the component generates a random nonce. In block 503, the component sends its nonce to each other member as indicated by the member list. In block 504, the component initializes the total of all the nonces. This total is used to elect an exit member. In block 505, the component signals to start the distribution of the share contribution vectors. The distribution can proceed in parallel with the election of the exit member. However, a member cannot send its total contribution vector to the exit member until the member completes the election. The component then completes.

Figure 6:
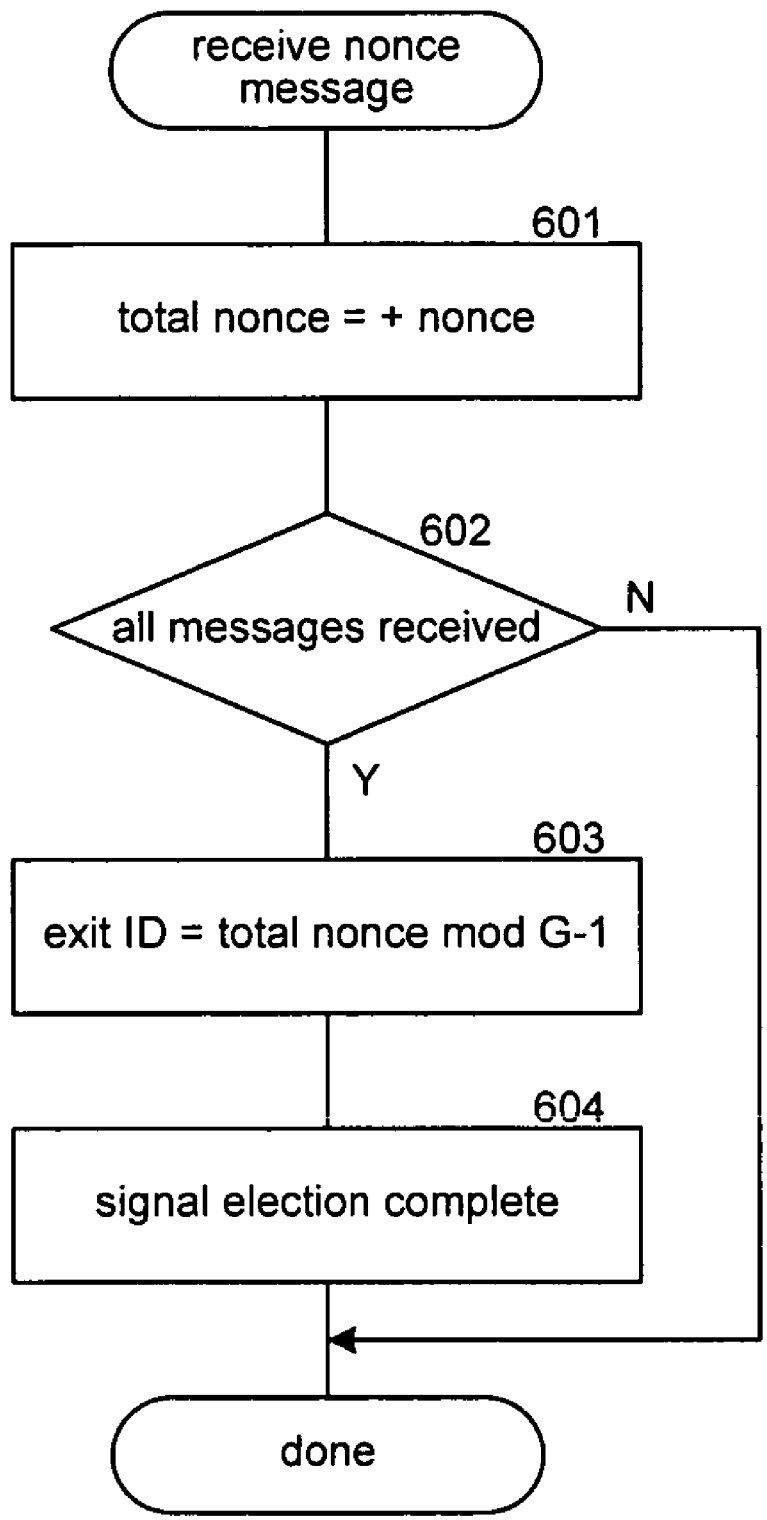
FIG. 6 is a flow diagram that illustrates the processing of the receive nonce message component of the aggregation system in one embodiment.

FIG. 6 is a flow diagram that illustrates the processing of the receive nonce message component of the aggregation system in one embodiment. The component calculates the total of the nonces of the members and then identifies the exit member when all the nonces have been received. In block 601, the component adds the received nonce to the total of the nonces. In decision block 602, if all the nonces have been received, then the component continues at block 603, else the component completes. In block 603, the component identifies the member that has been elected as the exit member by taking the modulo of the total of the nonces and the number of members eligible to be an exit member. In block 604, the component signals that the election is complete and then the component completes. Once the election is complete, a member can then forward its total contribution vector to the exit member.

Figure 7:
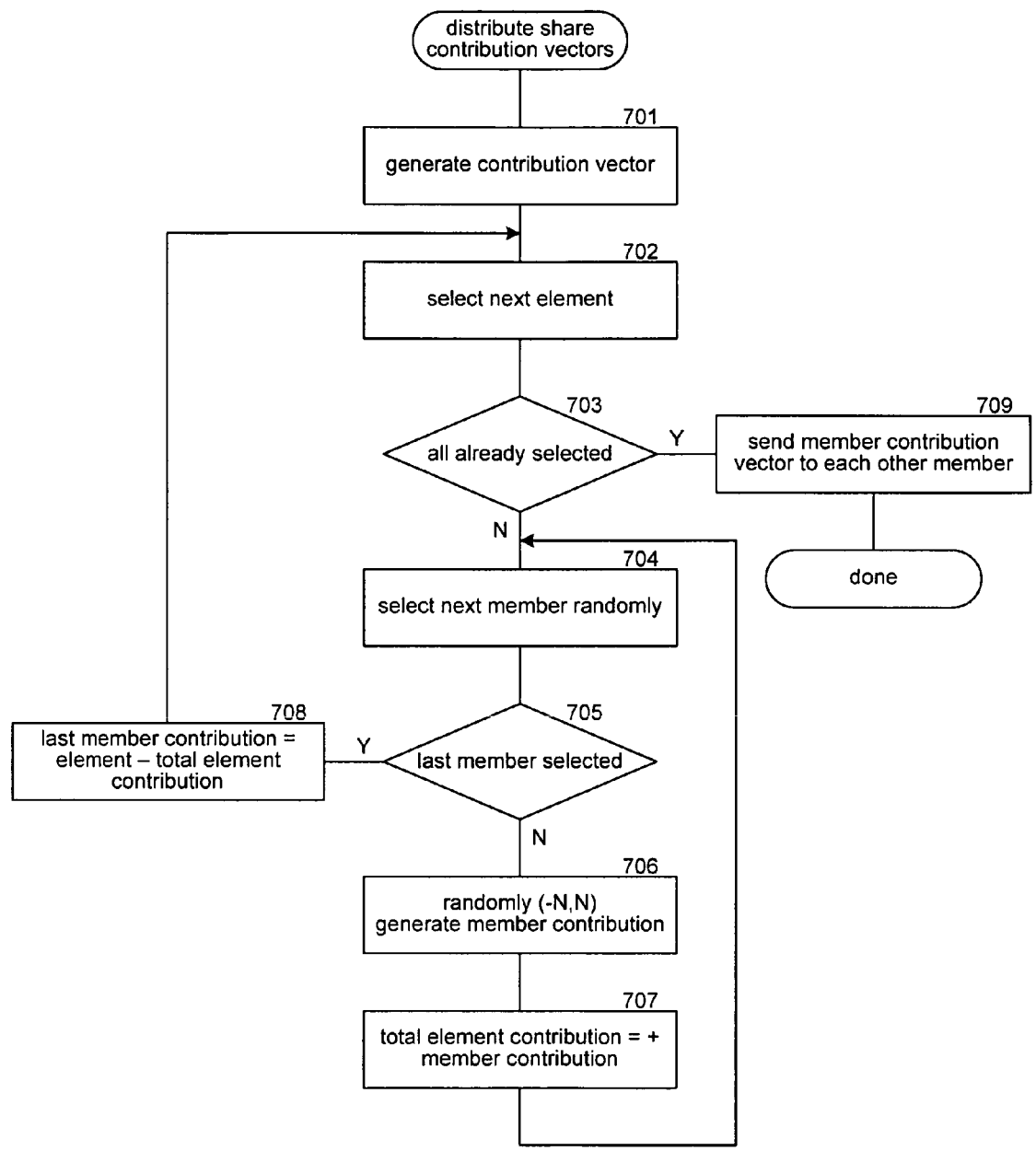
FIG. 7 is a flow diagram that illustrates the processing of the distribute share contribution vector component of the aggregation system in one embodiment.

FIG. 7 is a flow diagram that illustrates the processing of the distribute share contribution vector component of the aggregation system in one embodiment. The component generates the contribution vector of a member, divides the contribution vector into share contribution vectors, and then forwards the share contribution vectors to the other members. The member contribution of the entrance member includes the contribution forwarded to it by its friend device that forwarded the request. This component may be invoked for each configuration parameter included in the request for data. In block 701, the component generates a contribution vector of the member. In blocks 702-708, the component loops generating a share contribution vector for each a member. In block 702, the component selects the next element of the contribution vector. In decision block 703, if all the elements have already been selected, then the component continues at block 709, else the component continues at block 704. In blocks 704-708, the component loops randomly selecting members and assigning randomly generated values for the selected element to the selected member except for the last member that is selected. In block 704, the component randomly selects a next member. In decision block 705, if the last member is currently selected, then the component continues at block 708, else the component continues at block 706. In block 706, the component sets the contribution of the selected member for the selected element to a randomly generated contribution. In block 707, the component calculates a total of the randomly generated contributions for the selected element and then loops to block 704 to select the next member. In block 708, the component sets the contribution of the last selected member to the actual value of the element from the contribution vector minus the total element contribution. Thus, when the contributions of the members for the selected element are added together, the result would be the actual value of the contribution vector. The component then loops to block 702 to select the next element of the contribution vector. In block 709, the component sends the share contribution vector to each other member and then completes.

Figure 8:
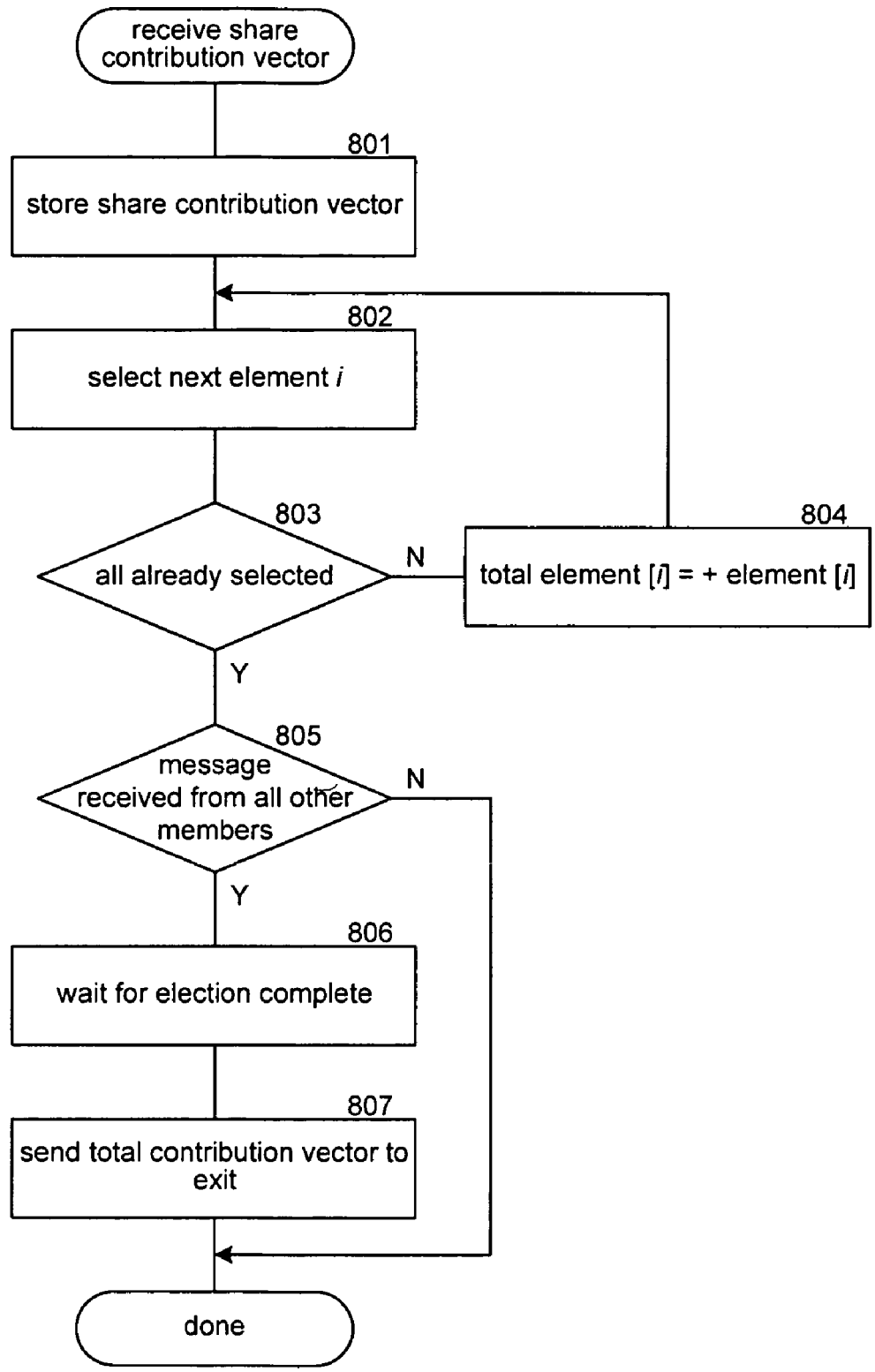
FIG. 8 is a flow diagram that illustrates the processing of the receive share contribution vector of the aggregation system in one embodiment.

FIG. 8 is a flow diagram that illustrates the processing of the receive share contribution vector of the aggregation system in one embodiment. The component generates a running total of the elements of the share contribution vectors that have been received so far. When all the share contribution vectors have been received, the component waits for the election to complete and then sends the total contribution vector to the exit member. In block 801, the component stores the share contribution vector that has been received. In blocks 802-804, the component loops adding in the contribution of the share contribution vector to the total contribution vector. In block 802, the component selects the next element of the contribution vector. In decision block 803, if all the elements have already been selected, then the component continues at block 805, else the component continues at block 804. In block 804, the component adds the selected element of the share contribution vector to the selected element of the total contribution vector and then loops to block 802 to select the next element. In decision block 805, if a share contribution message has been received from all other cluster members, then the component continues at block 806, else the component completes. In block 806, the component waits for the election of the exit member to complete. In block 807, the component sends the total contribution vector to the exit member and then completes.

Figure 9:
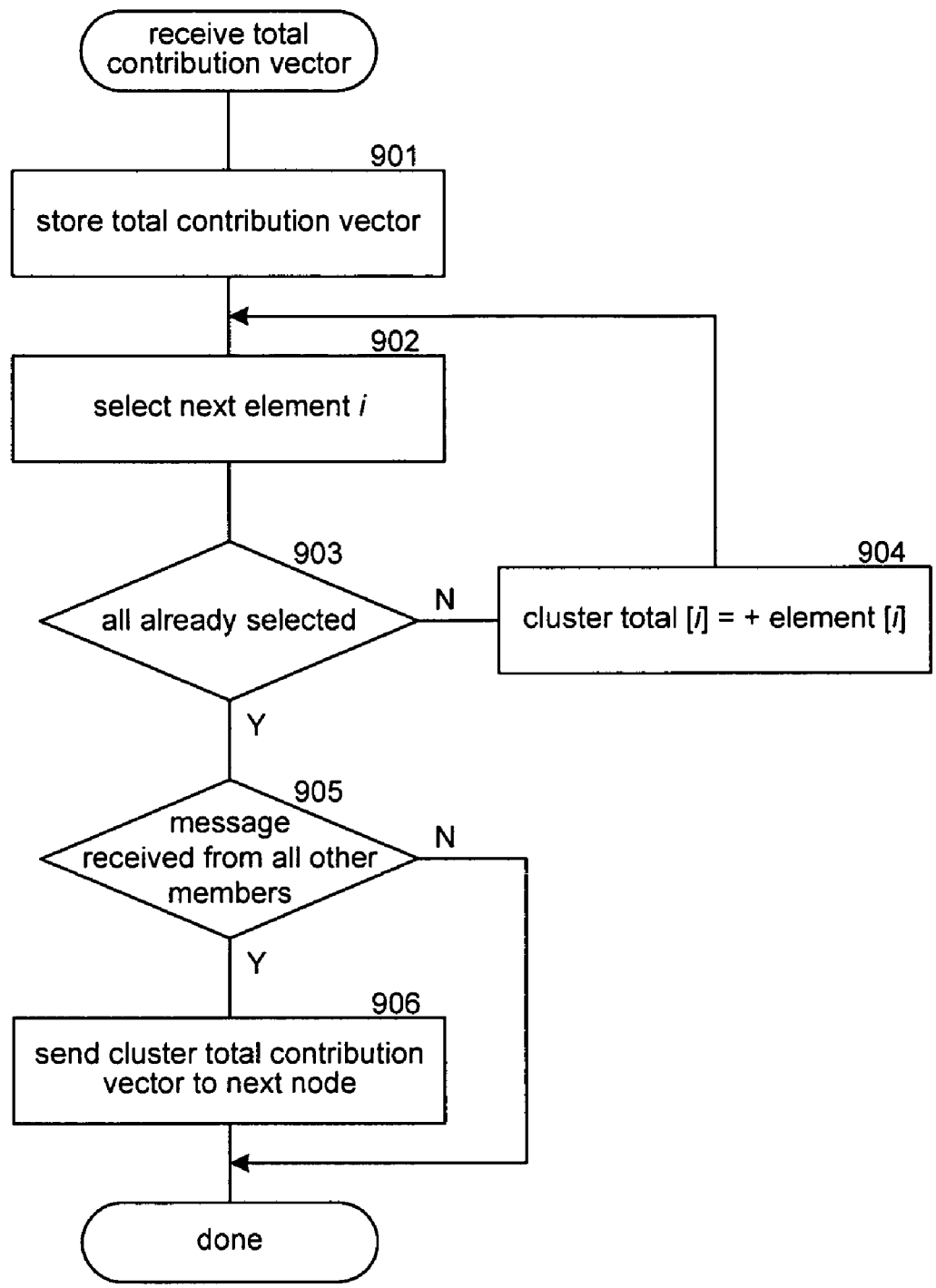
FIG. 9 is a flow diagram that illustrates the processing of the receive total contribution vector component of the aggregation system in one embodiment.

FIG. 9 is a flow diagram that illustrates the processing of the receive total contribution vector component of the aggregation system in one embodiment. The component is invoked by the exit member when a total contribution vector message is received. The component may have initialized the aggregate contribution vector to the total contribution vector of the exit member. In block 901, the component stores the total contribution vector. In blocks 902-904, the component loops adding the contribution of each element of the total contribution vector to the aggregate contribution vector. In block 902, the component selects the next element of the contribution vector. In decision block 903, if all the elements have already been selected, then the component continues at block 905, else the component continues at block 904. In block 904, the component adds the value of the selected element of the total contribution vector to the selected element of the aggregate contribution vector. The component then loops to block 902 to select the next element. In decision block 905, if a total contribution vector message has been received from all of the other members, then the component continues at block 906, else the component completes. In block 906, the component forwards the request for data received by the entrance member updated with the aggregate contribution vector to a friend device and then completes.

Figure 10:
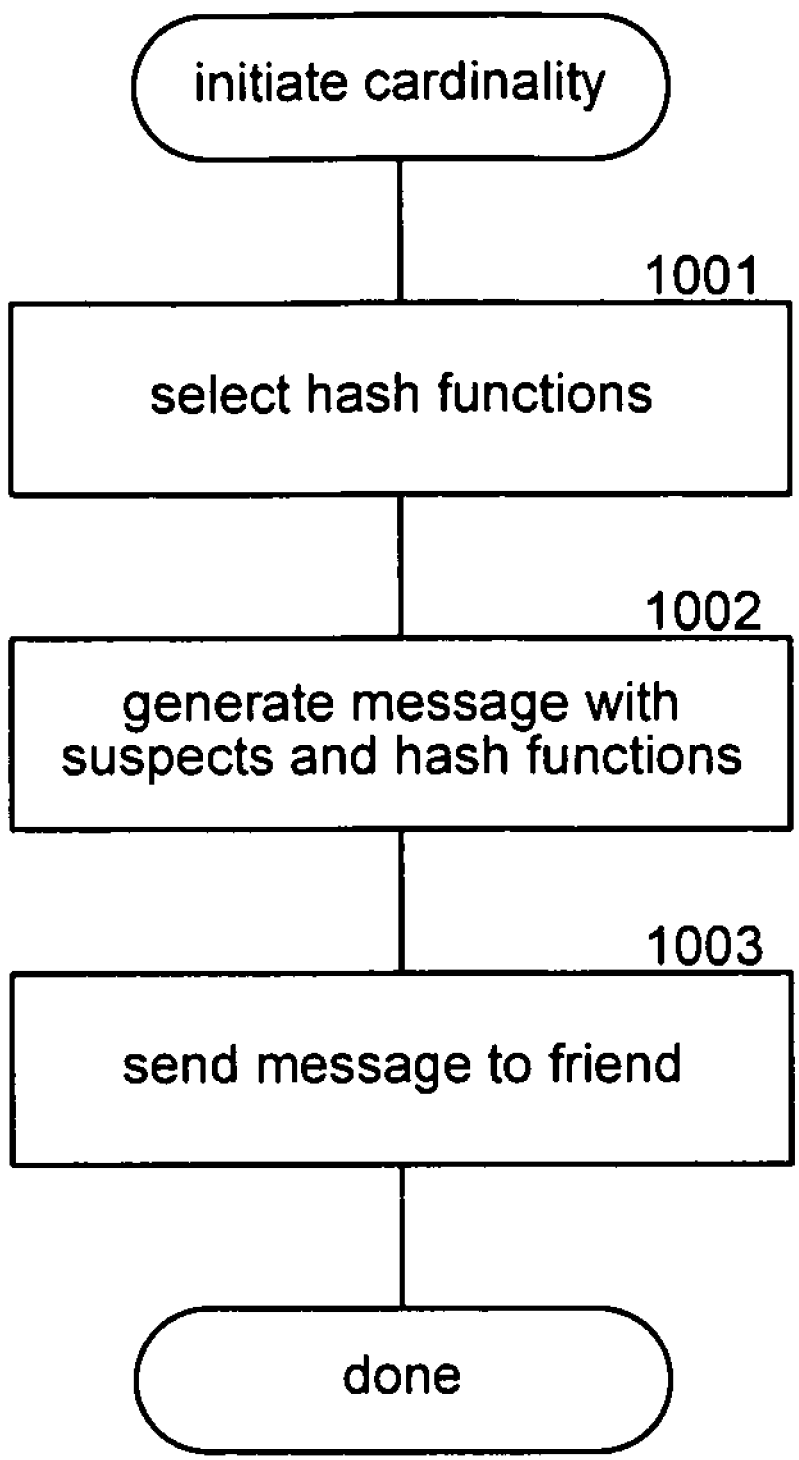
FIG. 10 is a flow diagram that illustrates the processing of the initiate cardinality determination component of the aggregation system in one embodiment.

FIG. 10 is a flow diagram that illustrates the processing of the initiate cardinality determination component of the aggregation system in one embodiment. The component is invoked by a device that wants to determine the cardinality of a configuration parameter. The component sends an initiate message to a friend device, which is forwarded to friend devices until the desired number of devices contribute. In block 1001, the component selects the hash functions to be used by the devices to make their contribution. In block 1002, the component generates a message that identifies the configuration parameter and the hash functions. In block 1003, the component sends the message to a friend device for forwarding to its friend devices recursively until the desired number of contributions is collected. The component then completes.

Figure 11:
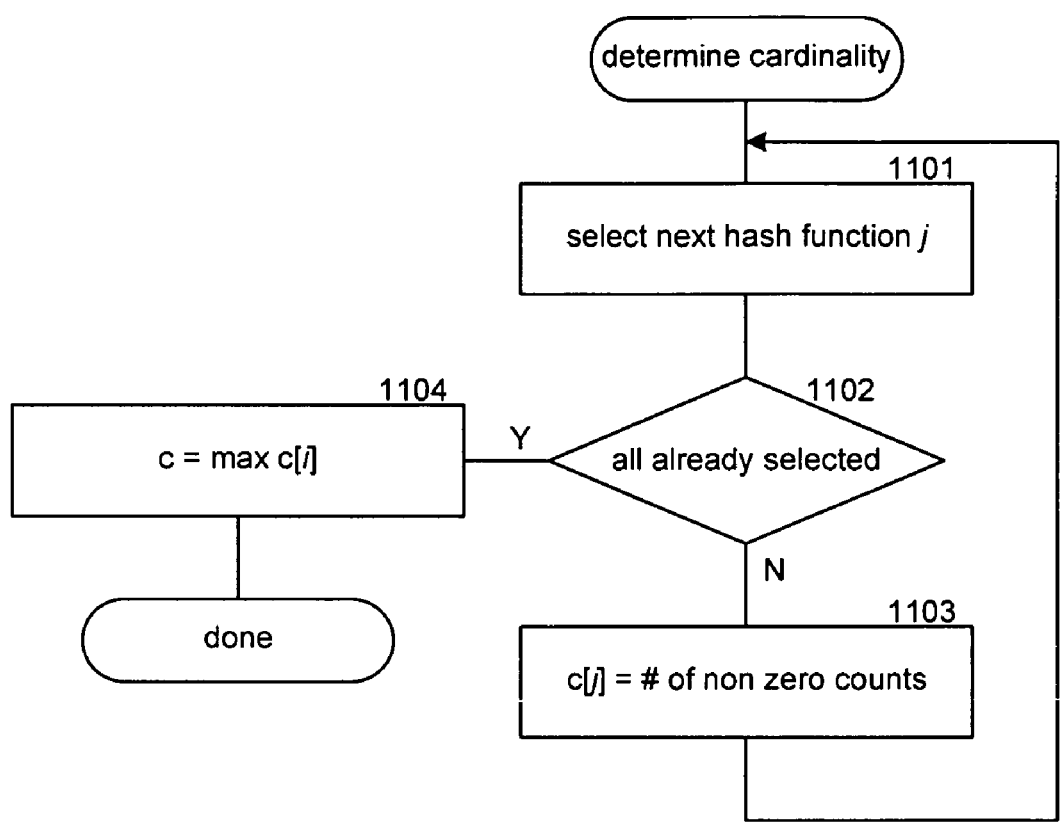
FIG. 11 is a flow diagram that illustrates the processing of the determine cardinality component of the aggregation system in one embodiment.

FIG. 11 is a flow diagram that illustrates the processing of the determine cardinality component of the aggregation system in one embodiment. The component is invoked when a message is returned from the friend device that includes the contributions from the desired number of devices. The component determines the cardinality as the hash function with the most nonzero elements. In block 1101, the component selects the next hash function. In decision block 1102, if all the hash functions have already been selected, then the component continues at block 1104, else the component continues at block 1103. In block 1103, the component sets the cardinality indicated by the selected hash function to the number of nonzero elements indicated by the hash function contribution vector. The component then loops to block 1101 to select the next hash function. In block 1104, the component selects the maximum of the cardinality of each hash function as the cardinality for the configuration parameter and then completes.

Figure 12:
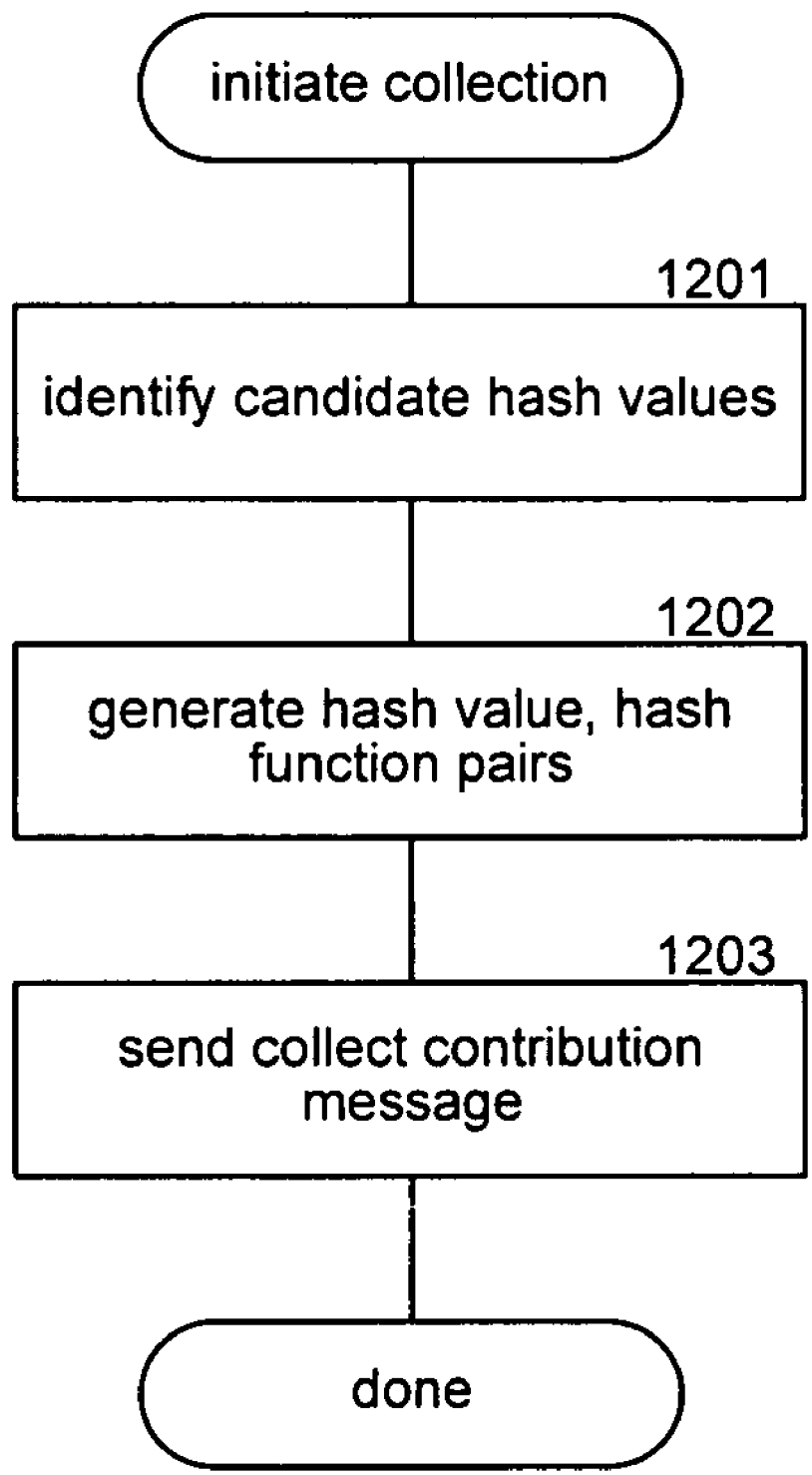
FIG. 12 is a flow diagram that illustrates the processing of the initiate collection component of the aggregation system in one embodiment.

FIG. 12 is a flow diagram that illustrates the processing of the initiate collection component of the aggregation system in one embodiment. This component is invoked after the cardinality of a configuration parameter has been determined to collect the actual value for a hash value. In block 1201, the component identifies candidate hash values whose actual values are to be determined. For example, if the initiating device wants to determine the most popular value, then it may select the hash value with the highest count. In block 1202, the component generates a message that identifies a hash value and the hash function used to generate that hash value. In block 1203, the component sends a message that includes the hash value and hash function pair to initiate the collection and then completes. As described above, the members of a cluster may aggregate their contributions and the exit member of the cluster divides the sum of the total contribution vectors by the number of contributing members to give the actual value.

Figure 13:
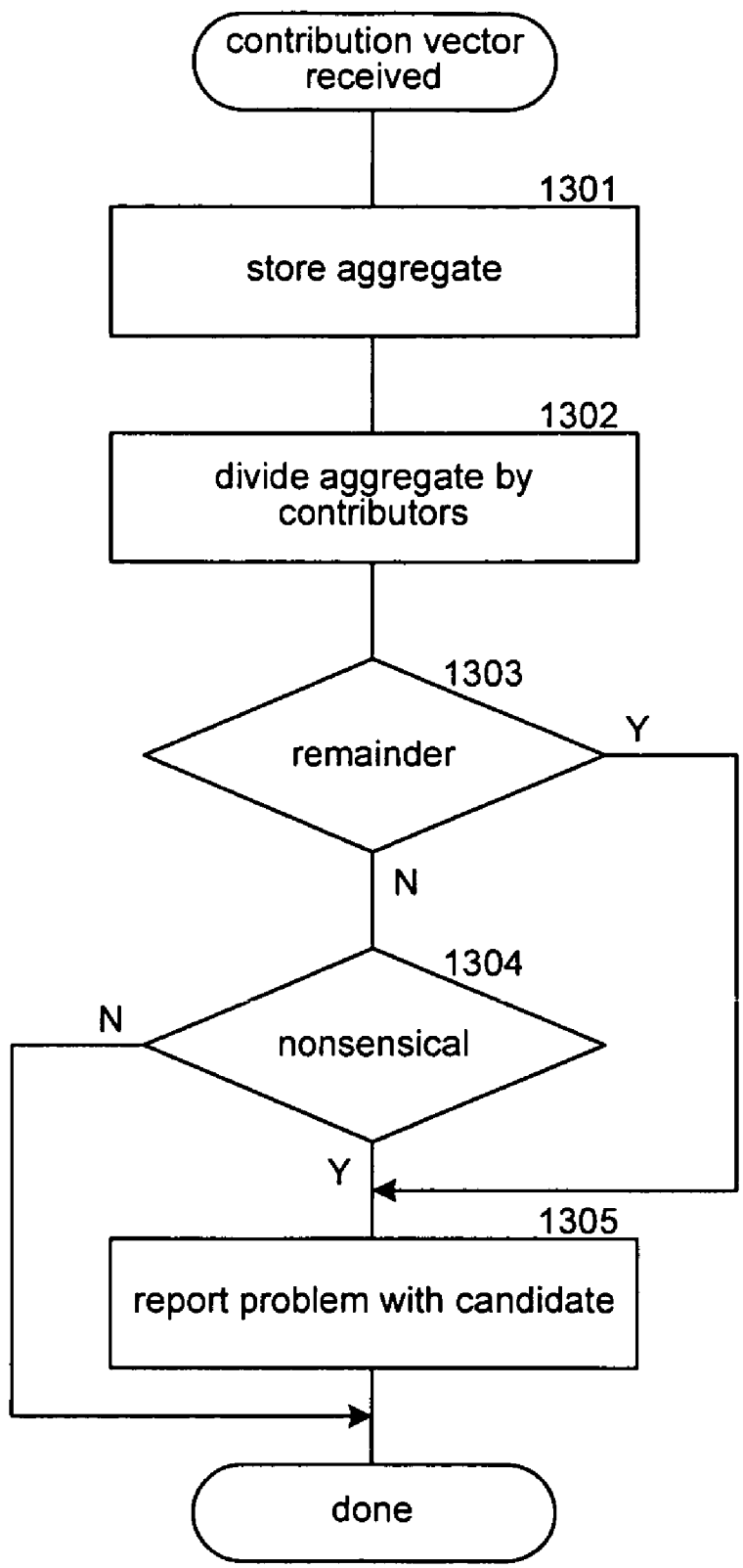
FIG. 13 is a flow diagram that illustrates the processing of the receive contribution vector component of the aggregation system in one embodiment.

FIG. 13 is a flow diagram that illustrates the processing of the receive contribution vector component of the aggregation system in one embodiment. The component is invoked by an exit member after all the total contribution vectors have been received. The component divides the aggregate by the number of contributing members. In block 1301, the component stores the sum of the total contribution vectors. In block 1302, the component divides the sum by the number of contributing members. In decision block 1303, if the remainder is nonzero, then the component continues at block 1305, else the component continues at block 1304. In decision block 1304, if the result of the division is nonsensical, the component competes continues at block 1305, else the component completes. The results of the division may be nonsensical if, for example, the actual value should contain only alpha values, but it actually contains some numeric values. In block 1305, the component reports a problem with the result and then completes.

From the foregoing, it will be appreciated that specific embodiments of the invention have been described herein for purposes of illustration, but that various modifications may be made without deviating from the spirit and scope of the invention. For example, a member of a cluster could send each share contribution vector to the exit member rather than totaling the share contribution vectors. So long as the originator of the share contribution vectors is not known by the exit member, it would be difficult to infer the contribution of a member. Accordingly, the invention is not limited except as by the appended claims.

We claim:

1. A method performed by devices of a cluster and an aggregator device for collecting a configuration parameter from the devices of the cluster, the method comprising:
   for each device of the cluster from which the configuration parameter is to be collected,
      dividing into shares, wherein each share is a numeric value, by that device the configuration parameter that is to be collected from that device such that a summation of the divided shares equals the configuration parameter to be collected from that device; and
      sending each share from that device to a different device of the cluster, such that each of the different devices receives only one share of that device;
   for each device of the cluster to which shares were sent,
      receiving by that device the shares from other devices;
      totaling by that device the received shares such that the total is a summation of the received shares; and
      sending the total of the received shares from that device to the aggregator device; and
   at the aggregator device of the cluster,
      receiving the totals from each of the devices of the cluster that totaled the shares; and
      adding the totals received from each of the devices to generate an aggregation of the configuration parameter collected from the devices of the cluster.

2. The method of claim 1 including electing a device of the cluster to be the aggregator device.

3. The method of claim 1 wherein a device that decides to not contribute its configuration parameter to the aggregate configuration parameter of the cluster sends shares whose total results in no contribution to the aggregate configuration parameter.

4. The method of claim 1 wherein the cluster includes an entrance device that receives a request from a friend device to provide the configuration parameter.

5. The method of claim 4 wherein the aggregator device is an exit device that forwards the aggregate configuration parameter of the devices of the cluster to a friend device.

6. The method of claim 1 wherein the devices of the cluster elect the aggregator device.

7. The method of claim 1 wherein the aggregator device forwards the aggregate configuration parameter to an exit device of the cluster.

8. The method of claim 1 wherein an entrance device invites devices to join the cluster.

9. The method of claim 8 wherein the entrance device provides the identity of each device in the cluster to each device in the cluster.

10. A system for aggregating configuration information of devices, comprising at each of the devices:
    a memory with computer-executable instructions that provide:
       a component that divides into shares the configuration information that the device is to contribute to the aggregation wherein the shares are numeric values and a summation of the divided shares equals the configuration information and sends each share to a different device such that each of the different devices receive a different share;
       a component that receives shares from other devices, totals the received shares such that the total is a summation of the received shares, and sends an indication of the total of the received shares to an aggregator device; and
       a component that when the device is designated as the aggregator device receives from other devices the indications of the total of the shares received by the other devices and aggregates the totals to generate an aggregation of the configuration information of the devices; and
    a processor for executing the computer-executable instructions stored in the memory.

11. The system of claim 10 including a component to elect a device to be an aggregator device.

12. The system of claim 10 wherein the component that sends shares sends shares whose total results in no contribution to the aggregate information when a device decides to not contribute its information.

13. The system of claim 10 including a component that invites devices to join a cluster of devices that contribute.

14. The system of claim 13 wherein a device that accepts an invitation to join decides not to make a contribution.

15. The system of claim 10 wherein the devices form a cluster with a device designated as an entrance device and a device designated as an exit device.

16. A computer-readable storage medium containing instructions for controlling a device to participate in the collection of configuration information, by a method comprising:
- receiving at the device an indication of devices of a cluster;
- dividing by the device into a plurality of shares the configuration information that is to be collected from the device wherein each share is a numeric value and a summation of the plurality of shares represents the configuration information;
- sending each share of the plurality of shares to another device of the cluster, such that each device receives a different share;
- upon receiving shares from other devices of the cluster,
    - totaling by the device the received shares such that the total is a summation of the received shares; and
    - sending an indication of the total of the shares to an aggregator device of the cluster for aggregation by the aggregator device of the shares into the aggregate information of the devices of the cluster by summing the shares received by the aggregator device; and
- when the device is the aggregator device of the cluster,
    - receiving the indications of the totals from each of the other devices of the cluster that totaled the shares; and
    - adding the totals to generate an aggregation of the configuration parameter collected from the devices of the cluster.

17. The computer-readable medium of claim 16 including electing a device of the cluster to be the aggregator device.

18. The computer-readable medium of claim 16 wherein the configuration information is used in diagnosing a configuration problem with a sick device.

* * * * *